Dec. 23, 1952 C. C. SCHULTZ Re. 23,604

REPACKABLE OIL FILTER CARTRIDGE

Original Filed June 10, 1949 2 SHEETS—SHEET 1

Inventor

Charles C. Schultz by W. S. J. Mills

ATTORNEY

REPACKABLE OIL FILTER CARTRIDGE

Original Filed June 10, 1949 2 SHEETS--SHEET 2

Inventor
Charles C. Schultz
by W. S. J. Miller
ATTORNEY

Reissued Dec. 23, 1952

Re. 23,604

UNITED STATES PATENT OFFICE 23,604

REPACKABLE OIL FILTERING CARTRIDGE

Charles C. Schultz, Calgary, Alberta, Canada

Original No. 2,559,133, dated July 3, 1951, Serial No. 70,037, January 10, 1949. Application for reissue August 10, 1951, Serial No. 242,770

7 Claims. (Cl. 210—183)

Matter enclosed in heavy brackets [ ] appears in the original patent but forms no part of this reissue specification; matter printed in italics indicates the additions made by reissue.

My invention relates to a repackable filter cartridge for use within a case in the process of elimination of sludge and such foreign matter from the oil used in lubrication of engines, with particular reference to internal combustion engines, and comprises such parts as will allow the filtering material contained therein to be ejected by hand for replacement with a fresh supply.

The advantage of my invention is that the filtering material, such as ordinary "waste," is slidably ejectable from the perforated cartridge shell, and the cartridge as a container for the "waste" is usable indefinitely, and is repackable with clean "waste" when necessary.

A further advantage is that the "waste" may be readily examined to ascertain that proper filtering is taking place without having to destroy the cartridge, as is the case with conventional oil filtering cartridges.

Still further advantages are that this cartridge is of very simple construction, and its main object provides for quick inspection and repacking, and that there are no screws or nuts to manipulate, and the ends of a locking bale are merely drawn together to eject the contents by pushing a bottom plate upwardly inside the cartridge shell.

With the above-mentioned objects and advantages in view, this invention consists in the novel features of construction hereinafter described and claimed, and in the drawings accompanying this specification it must be observed that similar numerals refer to similar parts throughout the different views.

Figure 1:
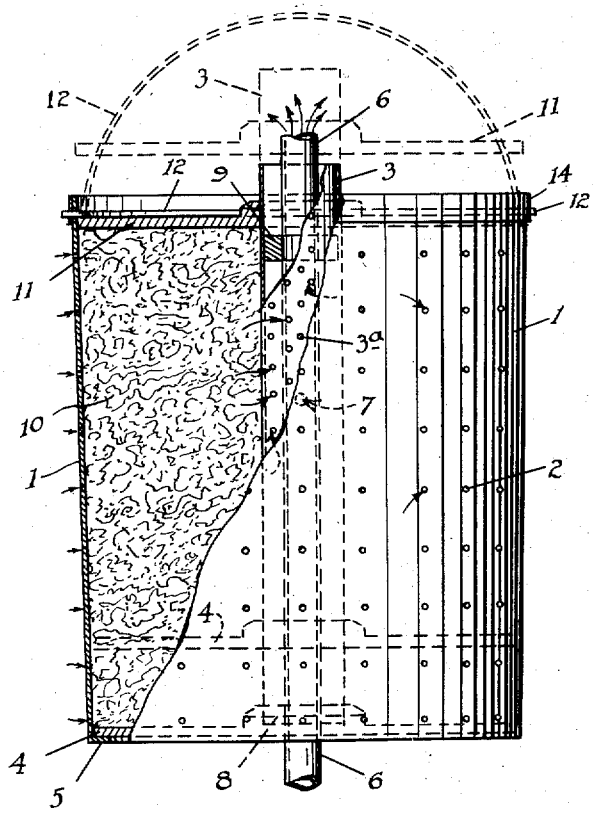
Fig. 1 is a fragmented elevational view of the oil cartridge.
Figure 2:
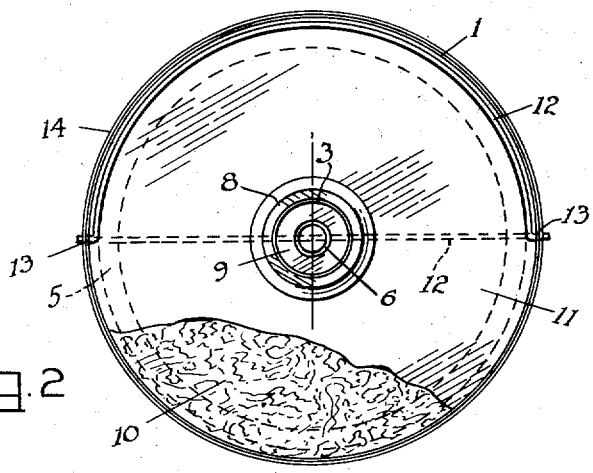
Fig. 2 is a fragmented plan view.
Figure 3:
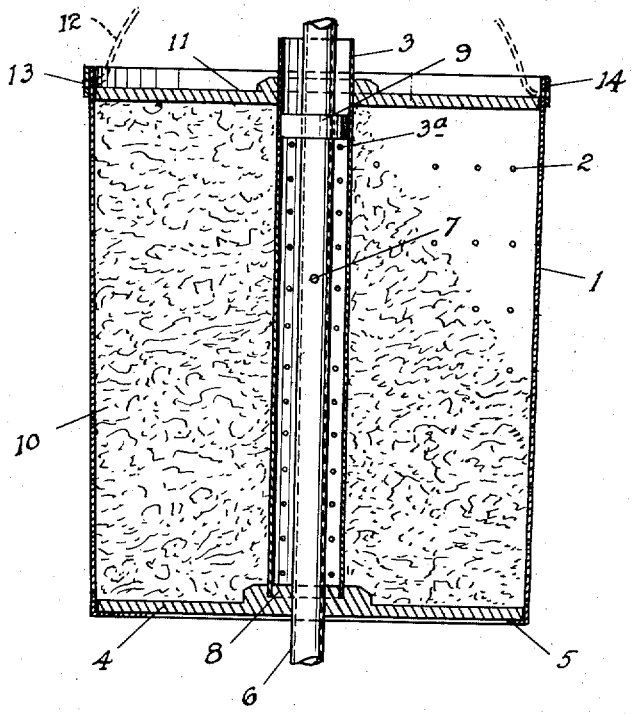
Fig. 3 is a sectional view showing the built-in upper and lower seals and the supporting hollow bolt.
Figure 4:
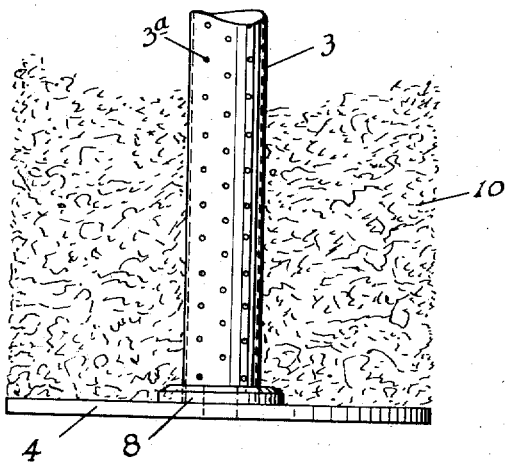
Fig. 4 shows the base push plate and the attached perforated tube.

In the drawings the numeral 1 refers to a circular tapered cartridge or cartridge shell for use with oil filters and having perforations 2 apertured through the wall thereof. This cartridge wall is tapered from a larger top diameter to its lesser diameter bottom opening as understood when in its normal operational position, in order to facilitate its removal from an oil containing oil filter case (not shown).

A tube 3 is centrally disposed within the cartridge, and is also perforated as at 3a throughout its length within the cartridge. The tube is axially parallel with the cartridge and projects above the top of same. A circular push plate 4 is affixed to the bottom end of said tube 3 and fits closely within the bottom of the cartridge, and is loosely slidable therewithin from bottom to top. A circular flange 5 acts as a stop to hold this plate 4 within the cartridge.

A hollowed cartridge-supporting bolt 6 has an oil-passaging aperture 7 located within the height of the cartridge. The juncture of the tube 3 within the plate 4 is so formed as to provide a sealing plug 8 between the said bolt 6 and the slidably contacted plug. A second sealing plug 9 within and near the top of the tube 3 within the height of the cartridge confines the oil passing through the perforations 3a to the annular space between tube 3 and bolt 6. From this space the oil passes through the aperture 7 for escape through the said oil-passaging bolt 6.

The cartridge shell 1 is filled with oil filtering material 10 such as ordinary "waste," surrounding the tube 3, and which material is held in place by means of an annular top covering disc 11 slidable within the top of the cartridge, and fits over the said centre tube 3.

A handling bale 12 is sprung into diametrically disposed holes 13 in the cartridge wall, and acts as a retainer in its vertical or flat positions to keep the flat disc 11 in place on top of the filter "waste."

To release the top disc 11 the ends of the bale are drawn together and the bale removed, and to eject the "waste" the bottom plate 4 is pushed upwardly and slidably through the cartridge shell. When repacked with clean "waste" the cartridge is placed in an oil filled conventional oil filter case, and the oil passes through the perforations 2 filtering through the "waste," thence passing through the apertures 3a into the tube 3 and out through the hollow bolt 6 by way of the aperture 7 therein for return to the lubricating system. This oil passaging process may be reversed in direction from the inside of the bolt 6 to and through the cartridge wall. The top [elge] *edge* of the cartridge wall may be reinforced with an added band 14.

*Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.*

What is claimed is:

1. In a perforated cylindrical type oil filtering cartridge as described for immersion in an oil filled container, and containing filtering material, *an outer cartridge filter wall*, a central perforated tube within the *outer* cartridge *filter wall* to fit over a supporting bolt hollowed and apertured for the passage of filtered or partly filtered oil therethrough and in spaced relationship therewith, an annular oil sealing plug at each end of said tube to slidably fit over said central bolt, a disc attached to the base end of said tube and slidably fitting within the *outer cartridge* filter wall for slidable ejection of the contained filtering material therefrom, means at the base end of said [container] *outer cartridge filter wall* to retain the said disc therein, an annular top disc slidable on said tube to hold the filtering material in place within the *outer* cartridge *filter wall* and a bale sprung into holes in the *outer* cartridge *filter* wall to retain said top disc in place.

2. A repackable type oil filter cartridge comprising an outer cylindrically shaped filtering waste container slightly tapered for easy removal from its case, and with wall perforations, filtering waste in said container, a central columnar perforated tube within said outer container and in spaced relationship therewith and affixed at one end to a circular push plate slidable through said container upwardly from the lesser diameter loosely towards the greater inside diameter thereof to remove the waste, a turned in flange around the base of said container to retain said push plate, an annular disc slidable over the upper end of said central tube to hold the waste in place within said container, a bale sprung into holes in the container wall to retain said disc in place, and means to slidably support said tube in a sealed manner at each end thereof on a filter cartridge supporting bolt for the passage and delivery of oil therethrough as received from the said tube.

*3. A repackable cartridge for a liquid filter having a liquid duct through which liquid flows, said repackable cartridge comprising an annular shell having a plurality of openings through which liquid may flow, said annular shell having first and second open ends, a tubular element disposed in said shell and having a plurality of apertures through which liquid may flow, said tubular element and said shell providing an annular space for filtering material, said tubular element being arranged for fluid connection to the liquid duct of the filter for flow of liquid through said apertures in said tubular element, end support means extending laterally of said anular space for ejecting said filtering material from said shell, said end support means being disposed at the first end of said shell and connected to an end of said tubular element for holding said filtering material in the annular space, said end support means slidably insertably fitting in said shell from said second end, stop means connected to the shell and extending inwardly from the first end portion thereof to arrest the movement of said end support means from sliding out of said first end, said stop means and said end support means supporting said tubular element within said shell, a removable cover at the second end of the shell and holding the filtering material in said shell at said second end, and readily operable means to removably hold said removable cover in place at said second end of the shell, said end support means being slidably ejectable from said shell in the direction of said first end to said second end and thereby forcing said filtering material from said shell ahead of said end support means.*

*4. In a liquid filter having a supporting bolt hollowed with a side-aperture for the passage of liquid therethrough, a repackable cartridge for said liquid filter, said repackable cartridge comprising an annular shell having a plurality of openings through which liquid may flow, said annular shell having first and second open ends, a tubular element having first and second end portions and disposed in said shell and having a plurality of apertures through which liquid may flow, said tubular element being slidably mounted on and in spaced relationship with the supporting bolt, said tubular element and said shell providing an annular space for filtering material, said end portions of the tubular element on opposite sides of said side-aperture, respectively, having a slidable seal connection with said supporting bolt, end support means extending laterally of said annular space for ejecting said filtering material from said shell, said end support means being disposed at the first end of said shell and connected to the first end portion of said tubular element for holding said filtering material in the annular space, said end support means slidably insertably fitting in said shell from said second end, stop means connected to the shell and extending inwardly from the first end portion thereof to arrest the movement of said end support means from sliding out of said first end, said stop means and said end support means supporting said tubular element within said shell, a removable cover at the second end of the shell and holding the filtering material in said shell at said second end, and readily operable means to removably hold said removable cover in place at said second end of the shell, said end support means being slidably ejectable from said shell in the direction of said first end to said second end and thereby forcing said filtering material ahead of said end support means.*

*5. A repackable cartridge for a liquid filter having a liquid duct through which liquid flows, said repackable cartridge comprising an annular shell having a plurality of openings through which liquid may flow, said annular shell having first and second open ends, a tubular element disposed in said shell and having a plurality of apertures through which liquid may flow, said tubular element and said shell providing an annular space for filtering material, said tubular element being arranged for fluid connection to the liquid duct of the filter for flow of liquid through said apertures in said tubular element, end support means extending laterally of said annular space for ejecting said filtering material from said shell, said end support means being disposed at the first end of said shell and connected to an end of said tubular element for holding said filtering material in the annular space, said end support means slidably insertably fitting in said shell from said second end, stop means connected to the shell and extending inwardly from the first end portion thereof to arrest the movement of said end support means from sliding out of said first end, said stop means and said end support means supporting said tubular element within said shell, a removable cover at the second end of the shell and holding the filtering material in said shell at said second end, and readily operable means to removably hold said removable cover in place at said second end*

*of the shell, said end support means being slidably ejectable from said shell in the direction of said first end to said second end and thereby forcing said filtering material from said shell ahead of said end support means, said shell at said second end having a larger cross-sectional area than at said first end to facilitate the ejection of said filtering material.*

*6. A repackable cartridge for a liquid filter having a liquid duct through which liquid flows, said repackable cartridge comprising an annular shell having a plurality of openings through which liquid may flow, said annular shell having first and second open ends, a tubular element having first and second end portions and disposed in said shell and having a plurality of apertures through which liquid may flow, said tubular element and said shell providing an annular space for filtering material, said tubular element being arranged for fluid connection to the liquid duct of the filter for flow of liquid through said apertures in said tubular element, end support means extending laterally of said annular space for ejecting said filtering material from said shell, said end support means being disposed at the first end of said shell and connected to the first end portion of said tubular element for holding said filtering material in the annular space, said end support means slidably insertably fitting in said shell from said second end, stop means connected to the shell and extending inwardly from the first end portion thereof to arrest the movement of said end support means from sliding out of said first end, said stop means and said end support means supporting said tubular element within said shell, a removable cover slidably mounted on the second end portion of the tubular element at the second end of the shell and holding the filtering material in said shell at said second end, and readily operable means to removably hold said removable cover in place at said second end of the shell, said end support means being slidably ejectable from said shell in the direction of said first end to said second end and thereby forcing said filtering material from said shell ahead of said end support means.*

*7. A repackable cartridge for a liquid filter having a liquid duct through which liquid flows, said repackable cartridge comprising an annular shell having a plurality of openings through which liquid may flow, said annular shell having*

*first and second open ends, a tubular element disposed in said shell and having a plurality of apertures through which liquid may flow, said tubular element and said shell providing an annular space for filtering material, said tubular element being arranged for fluid connection to the liquid duct of the filter for flow of liquid through said apertures in said tubular element, end support means extending laterally of said annular space for ejecting said filtering material from said shell, said end support means being disposed at the first end of said shell and connected to an end of said tubular element for holding said filtering material in the annular space, said end support means slidably insertably fitting in said shell from said second end, stop means connected to the shell and extending inwardly from the first end portion thereof to arrest the movement of said end support means from sliding out of said first end, said stop means and said end support means supporting said tubular element within said shell, a removable cover at the second end of the shell and holding the filterable material in said shell at said second end, and readily operable means engaging said shell at the second end thereof to removably hold said removable cover in place at said second end of the shell, said end support means being slidably ejectable from said shell in the direction of said first end to said second end and thereby forcing said filtering material from said shell ahead of said end support means.*

CHARLES C. SCHULTZ.

REFERENCES CITED

The following references are of record in the file of this patent or the original patent:

UNITED STATES PATENTS

| Number | Name | Date |
|---|---|---|
| 1,930,209 | Milkey | Oct. 10, 1933 |
| 2,247,445 | Long | July 1, 1941 |
| 2,275,481 | Wilkinson | Mar. 10, 1942 |
| 2,280,033 | Aldham | Apr. 14, 1942 |
| 2,294,262 | Wilkinson | Aug. 25, 1942 |
| 2,342,948 | Long | Feb. 29, 1944 |
| 2,364,240 | Parry | Dec. 5, 1944 |
| 2,463,929 | West | Mar. 8, 1949 |

OTHER REFERENCES

"Filtration and Filters," Pickard, pp. 33 and 34, Ernest Benn Lmt., 1929.